Feb. 1, 1955        L. L. LEHMANN        2,700,842
FISH LURE
Filed Nov. 25, 1952
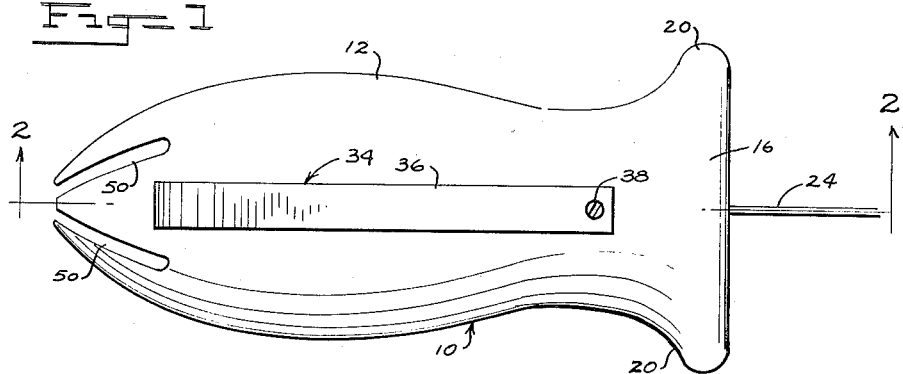
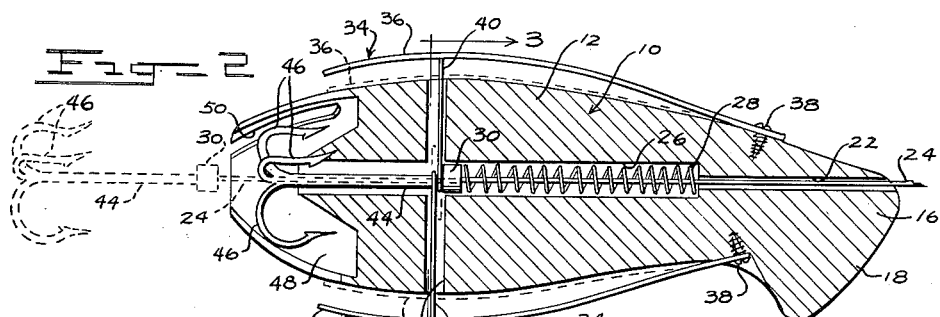
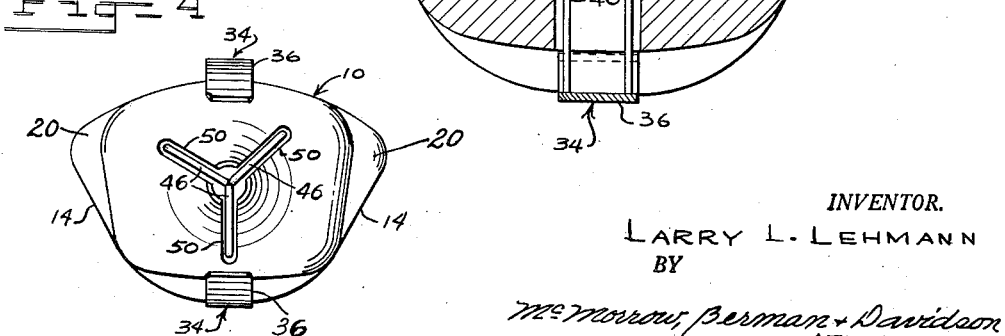
INVENTOR.
LARRY L. LEHMANN
BY
McMorrow, Berman & Davidson
ATTORNEYS

United States Patent Office 2,700,842
Patented Feb. 1, 1955

2,700,842
FISH LURE
Larry L. Lehmann, Louisville, Ky.

Application November 25, 1952, Serial No. 322,426

2 Claims. (Cl. 43—35)

This invention relates to a fish lure, and more particularly, has reference to a lure designed to prevent snagging thereof on underwater obstructions, and further designed to impart to the lure an unusual action in the water.

In many instances, relatively expensive fish lures are lost, by reason of the snagging thereof on surface or underwater obstructions. The snagging of the lure is caused, in most instances, by reason of the fact that the hooks carried by the lure are exposed, in positions in which said hooks will engage an obstruction of the type stated.

In view of the above, it is one of the important objects of the present invention to provide a lure of snagless design, the lure being so formed as to include a mechanism that is particularly adapted to hold the hooks of the lure in normally retracted positions, said mechanism being tripped by a fish when the fish takes the lure, and being adapted, when tripped, to cause movement of the hooks to an extended position.

A further important object is to provide a fish lure of the type stated which will have a body portion and a head so shaped as to make the lure more attractive to fish, while imparting to the lure a highly active movement within the water, which movement will attract fish in the vicinity.

Still another object is to provide a fish lure as stated so formed as to permit a leader or fishing line to be connected directly to the retractile hook, the movement of the hook to an extended position enabling the lure body to slide freely on the fishing line, thus to cause said body to interfere to a minimum extent with the playing and landing of the game fish.

Other objects will appear from the following description, the claims appended thereto, and from the annexed drawing, in which like reference characters designate like parts throughout the several views, and wherein:

Figure 1 is a top plan view of a fish lure formed in accordance with the present invention, the hooks being omitted;

Figure 2 is a longitudinal sectional view taken on line 2—2 of Figure 1, the dotted lines showing the hook in its extended position, and the full lines showing the hook in its retracted position;

Figure 3 is an enlarged transverse sectional view taken on line 3—3 of Figure 2, showing the trigger means embodied in the invention; and Figure 4 is a rear elevational view of the fish lure.

Referring to the drawing in detail, the reference numeral 10 has been applied generally to a solid body, which body can be formed of molded plastic or any other material found suitable for the purpose. Obviously, the body can be externally painted or ornamented in any suitable manner, to increase the faithfulness of its simulation to a small fish or other aquatic animal.

The body 10 is integrally formed with a body portion 12, said body portion being tapered in the direction of its length, and having a relatively thick center area. The body portion tapers toward its opposite ends, as best shown in Figure 1, the body portion being tapered to a greater extent in the direction of its rear end than it is in the direction of its front end.

In considering the tapered formation of the body portion, it is to be noted that the sides of the body portion taper toward the opposite ends of the lure (see Figure 1), the top and bottom surfaces of the lure being correspondingly tapered. This imparts to the lure a generally elliptical shape.

In this connection, it is to be noted that not only are the side surfaces of the body portion tapered toward the opposite ends of the lure, but also, said side surfaces converge downwardly as shown at 14 in Figure 3.

Formed upon one end of the body portion, and molded integrally with said body portion, is a head 16, said head being inclined downwardly relative to the body portion as best shown in Figure 2. The front end surface of the head 18 extends normally to the longitudinal axis of the body portion, and is sloped toward the rear end of the lure, as best seen from Figure 2.

The head 16 is extended widthwise of the lure, to form thereon oppositely extending, lateral projections 20.

Preferably, the lure is rounded off at all parts of its exterior surface, thus to facilitate the smooth movement of the lure through the water. It may be noted, in this regard, that the particular shape of the lure is such as to impart to the same a lively action when the lure is drawn through the water during trolling or casting, thus to increase the attractiveness of the lure to game fish in the vicinity.

As shown in Figure 2, the body 10 of the fish lure constituting the present invention is formed with a longitudinal bore 22, said bore extending lengthwise of the body, fully from end to end thereof, and being aligned with the longitudinal center line of said body. The bore 22 opens at the front end of the body, for extension of a leader 24 or fishing line into said bore.

Intermediate the opposite ends of the lure, the bore 22 is formed with a counterbore 26, and seated in said counterbore is a coiled expansion spring 28. The expansion spring 28 abuts at one end against the shoulder defined by formation of the counterbore, said expansion spring abutting at its other end against a collar 30 loosely slidable within the counterbore.

In the body portion 12 of the lure, I also form a transverse bore 32, said bore being disposed normally to the bore 22, and communicating with the bore 22 intermediate the opposite ends of the body. The transverse bore 32 opens upon diametrically opposite portions of the exterior surface of the body, and overlying said diametrically opposite portions are trigger members, which trigger members constitute component parts of trigger assemblies designated generally at 34.

The trigger members have been designated by the reference numeral 36, and are formed as relatively elongated leaf springs, anchored at one end by screws 38 to the front end portion of the body.

The other end portions of the leaf springs are free, thus to permit depression of said springs, against the spring action thereof, to the dotted line positions shown in Figure 2.

Secured fixedly to the respective trigger members 36 are catches 40, said catches being of U-shape as best shown in Figure 3.

Each catch 40 is formed with a pair of elongated, parallel legs slidably mounted in the transverse bore 32, said legs merging into bight portions 42, which bight portions overlap medially between the opposite ends of the transverse bore.

As shown in Figure 3, there extends through the space defined between the overlapping bight portions 42 a hook shank 44, said shank comprising part of a hook 46, which hook, as shown in Figure 2, is of the three-pronged type in the illustrated embodiment of the invention.

The collar 30 is made rigid with the inner end of the hook shank 44, and thus it is seen that when the catches 40 are in the full line positions thereof shown in Figure 2, said catches will engage the collar 30 against movement to the left in Figure 2. As a result, the hooks 46 will be held in retracted positions, within a recess 48 formed in the rear end of the body in communication with the longitudinal bore 22.

Formed in the rear end portion of the body are converging slots 50, said slots being so arranged as to permit movement of the hooks 46 into and out of the recess 48.

Normally, the trigger members 36 will, by reason of the inherent springiness thereof, shift outwardly in opposite directions from the body, to the full line positions thereof shown in Figure 2. In this position of the trigger members, the bight portions 42 of the catches 40 will extend into the longitudinal bore 22, across the path of the collar 30 (see Figure 3).

As a result, the hook 46 will be held in a retracted position, with the spring 28 being held under compression.

If, however, a fish takes the lure, the fish, in biting upon the lure, will depress the trigger members 36, causing the bight portions 42 to move away from one another, thereby to release the hook 46 for movement to the extended positions thereof shown in dotted lines in Figure 2, under pressure of the expanding spring 28.

The fish will thus be effectively hooked, and after the fish has been landed, the lure can be reset with speed and ease, merely by holding the trigger members in a depressed position while manually shifting the hook 46 to its retracted position.

It will be appreciated that the construction illustrated and described is characterized by the particular arrangement wherein the hook 46 is wholly retracted within the body 10. Thus, the lure can be cast, or can be otherwise drawn through the water, without possibility of the lure snagging upon an underwater obstruction. The hook 46 will move to an extended position only when the lure is taken by a fish, since it is only at this time that the trigger members 36 will both be depressed. Depression of one trigger member, without depression of the other, is insufficient to trip the mechanism, and this is a desirable feature, since an underwater obstruction might strike one of the trigger members, while not striking the other.

What is claimed is:

1. A fish lure comprising a body having longitudinal and transverse bores communicating intermediate the opposite ends of the body; a hook mounted in the longitudinal bore for movement lengthwise of the body between retracted and extended positions respectively, said hook including a shank slidably mounted in the longitudinal bore and said shank having a collar formed thereon, said body having a recess at its rear end receiving the hook in the retracted position thereof, the longitudinal bore of the body extending fully from the front end of the body into communication with said recess, to allow connection of a line to the hook, said transverse bore opening upon diametrically opposite portions of the side surface of the body; a spring seated in said longitudinal bore and engaged with said collar, said spring being tensioned to normally urge the hook to its extended position; U-shaped catches mounted in the transverse bore at opposite sides of the longitudinal bore, said catches having overlapping bight portions extending across the longitudinal bore to engage the collar in the retracted position of said hook, thereby to hold the hook against movement to its extended position; and depressible trigger members of spring material mounted on the exterior surface of the body over said diametrically opposite portions of the side surface of the body, said trigger members being connected to the corresponding catches and, when said trigger members are simultaneously depressed, such members being adapted to act to shift the bight portions of the catches out of collar engaging position and thereby release the hook for movement to extended position under pressure of said spring.

2. A fish lure comprising a body having longitudinal and transverse bores communicating intermediate the opposite ends of the body, a hook mounted in the longitudinal bore for movement longitudinally of the body between retracted and extended positions respectively, said hook including a shank slidably mounted in the longitudinal bore and said shank having a collar formed thereon, said body having a recess at its rear end receiving the hook in the retracted position thereof, the longitudinal bore of the body extending fully from the front end of the body into communication with said recess to allow connection of a line to the hook, said transverse bore opening upon diametrically opposite portions of the side surface of the body, spring means operatively connected to the shank of said hook in the longitudinal bore and normally tending to urge the hook to its extended position, a pair of catches mounted in the transverse bore at opposite sides of the longitudinal bore, said catches having coacting portions extending across the longitudinal bore to engage the collar and thereby hold the hook against movement to its extended position, and depressible trigger members on the exterior surface of the body over said diametrically opposite portions of the side surface of the body and connected to the respective catches, said trigger members, when simultaneously depressed by a fish, being adapted to shift the coacting portions of the catches out of collar engaging position, thereby to release the hook for movement to extended position under the pressure of said spring means.

References Cited in the file of this patent

UNITED STATES PATENTS

| | | |
|---|---|---|
| 1,153,473 | Wilson | Sept. 14, 1915 |
| 1,288,552 | Foster | Dec. 24, 1918 |
| 1,318,073 | Gottschalk | Oct. 7, 1919 |
| 1,354,952 | Bullock | Oct. 5, 1920 |
| 2,315,247 | Davenport | Mar. 30, 1943 |
| 2,517,844 | Cooney | Aug. 8, 1950 |
| 2,521,555 | Widner | Sept. 5, 1950 |
| 2,552,113 | Prentice | May 8, 1951 |
| 2,589,343 | Cieslik | Mar. 18, 1952 |